Nov. 22, 1938.  W. A. EATON  2,137,939
TRANSMISSION CONTROL MECHANISM
Filed July 17, 1935
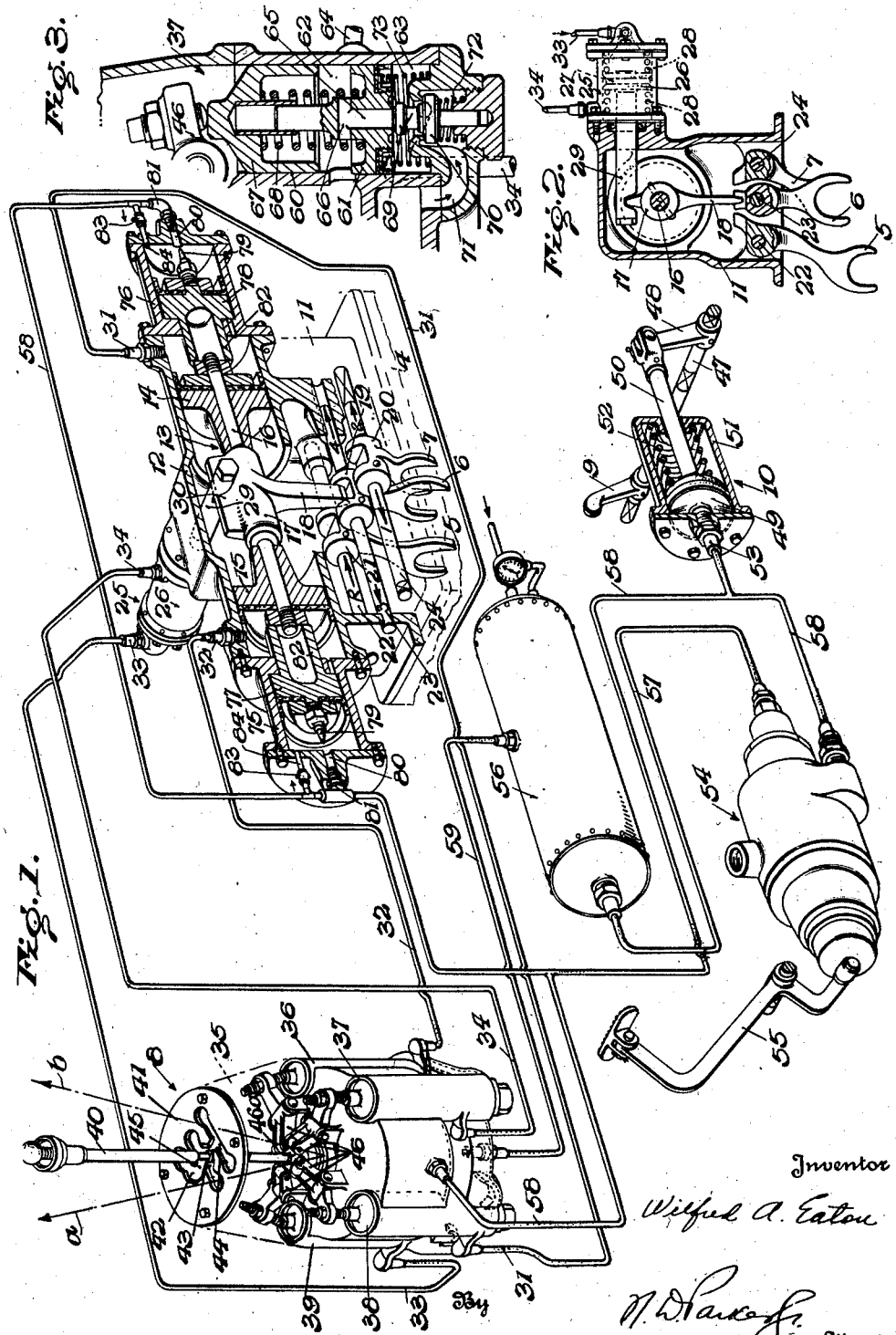

Patented Nov. 22, 1938

2,137,939

UNITED STATES PATENT OFFICE 2,137,939

TRANSMISSION CONTROL MECHANISM

Wilfred A. Eaton, Pittsburgh, Pa., assignor to Bendix-Westinghouse Automotive Air Brake Company, Pittsburgh, Pa., a corporation of Delaware Application July 17, 1935, Serial No. 31,938

18 Claims. (Cl. 192—3.5)

This invention relates to transmission gearing control mechanism and more particularly to a mechanism of the above character which may be remotely controlled and hence particularly adaptable for use in connection with automotive vehicles of the type having a transmission gearing located at a distance from the operator's control station.

One of the objects of the present invention is to provide a novel remote controlled vehicle transmission and clutch mechanism so constituted that energy for effecting establishment of a desired gear relation will be dependent upon disengagement of the vehicle clutch.

Another object of the invention is to provide a transmission control mechanism wherein a selector member may be moved by remote controlling means to select a desired gear relation and thereafter moved to establish such selected relation, such latter movement, however, being dependent upon disengagement of the vehicle clutch.

Still another object is to provide, in a transmission control mechanism of the above character, a novel arrangement insuring that during power-operated shifting of the transmission gears, the latter will be engaged slowly and efficiently in order to avoid undue noise and clashing.

A further object is to provide, in a transmission control mechanism, a fluid-operated power unit for establishing a selected gear relation, the movement of said unit being cushioned or checked throughout a portion of its stroke in order to cushion actual engagement of the transmission gears.

A further object is to provide, in a device of the above character, a novel combined cushioning and neutralizing power unit whereby engagement of the transmission gears is cushioned and wherein the unit operates to neutralize the gears.

A still further object is to provide a novel neutralizing device which shall be under the joint control of the remotely-positioned gear-shifting lever and the disengaging movement of the vehicle clutch, thus insuring that the clutch shall be disengaged when it is desired to neutralize the gears.

A further object is to provide a novel arrangement of parts which shall provide a remotely-controlled power gear-shifting mechanism of simple and sturdy construction as well as efficiently and positively operable and capable of ready installation on vehicles having selective transmission.

Other objects and novel features of the invention will appear more fully hereinafter from the following detailed description when taken in connection with the accompanying drawing, wherein a preferred embodiment of the invention is illustrated. It is to be expressely understood, however, that the drawing is employed for purposes of illustration only and is not designed as a definition of the limits of the invention, reference being had for this purpose to the appended claims.

In the drawing, wherein similar reference characters refer to similar parts throughout the several views:

Fig. 1 is a diagrammatic view, partly in section, illustrating an automotive vehicle transmission control mechanism constructed in accordance with the principles of the present invention;

Fig. 2 is a partial sectional view of a portion of the transmission control mechanism and illustrating the selector apparatus, and Fig. 3 is an axial sectional view of one of the control valves utilized with the manually-operable control unit of Fig. 1.

Referring more particularly to Fig. 1, a transmission control mechanism constructed in accordance with the present invention is illustrated therein in connection with a vehicle transmission gearing 4 of any well known type and including shifter forks 5, 6 and 7 engaged with the transmission gears or clutches, not shown, and operable in the usual manner to establish a desired gear relation. Preferably, the selection and establishment of the desired gear relation is effected through a power-operated mechanism remotely controlled through an operator-controlled unit 8, there being also provided a vehicle clutch-controlling element 9 and a fluid pressure-controlled actuator 10 therefor which is incorporated in the transmission control system in a manner which will appear more fully hereinafter.

The fluid pressure control for the transmission 4 more particularly includes a transmission cover 11 formed with a cylinder 12 in which a double-acting shifting piston assembly 13 comprising piston heads 14 and 15 respectively is adapted to reciprocate in either direction from the normal neutral position indicated, each of the piston heads being suitably secured to a piston rod 16 and having interposed therebetween a combined selecting and shifting finger 17, the latter being oscillatably mounted upon the piston rod. A depending portion 18 is formed integrally with the selector member 17 and normally engages the upper slotted end portion 19 of the shifter fork 6 but is adapted to be oscillated by means to be described hereinafter in detail to effect operative engagement with the upper slotted end portions 20 or 21 of the shifter forks 7 and 5 respectively. As shown, each of the shifter forks 5, 6 and 7 is secured to shifter bars 22, 23 and 24 respectively, and upon selection and movement of any of these shifter bars, desired gear relations of the transmission 4 will be established in a well known manner.

In order to effect oscillating movement of the selector member 17 for selection of a desired shifter bar, a fluid pressure-operated selector device 25 is provided which is constituted by a cylinder 26 having a piston 27 therein, the latter being normally maintained in the position shown in Fig. 2 as by means of centering springs 28. The piston 27 is provided with a piston rod 29 extending through one end wall of the cylinder 26 and is operatively engaged with a flanged extension 30 of the selector member 17, such extension being of such nature that the operative connection with the piston rod 29 is maintained irrespective of the longitudinal gear-establishing movement of the member 17. Suitable fluid pressure connections 31 and 32 are provded upon either side of the double-acting shifting piston assembly 13, while connections 33 and 34 are provided for admitting fluid pressure to the opposite ends of the selector device 25, it being readily perceived from the above described arrangement that by properly controlling the flow of fluid pressure through said connections, any desired shifter bar may be selected through operation of the device 25 and thereafter may be shifted in either of opposite directions through the double-acting shifting piston 13 to effect any desired gear relation.

Means are provided by the present invention for remotely controlling the flow of fluid pressure to the selector and shifting devices, and preferably such means are constituted by an operator-controlled unit 8 conveniently positioned adjacent the usual manually-operable controls of the vehicle. As shown, such unit includes a casing 35 housing a plurality of similar valve mechanisms 36, 37, 38 and 39 which are selectively operable through movement of a manually-controllable lever 40. Preferably, the construction is such that the lever 40 is movable in a conventional preselective gear-shifting simulating manner, and to this end the casing 35 is provided with a cover 41 having formed therein longitudinally-arranged parallel slots 42, 43 and 44 in which lever 40 may be moved. A transverse slot 45 interconnects the longitudinally-arranged slots and permits the lever 40 to be moved from one to another of the latter in a manner simulating manual control of a selective transmission gearing.

The control element 40 is preferably universally mounted within the control unit 8 in such a manner that the valves 36, 37, 38 and 39 will be selectively operated through cam mechanisms 46 during movement of the control lever 40. Operation of these cam mechanisms is effected by a cam operator 46a as the element 40 is pivotally moved about a point where the dot and dash lines $a$ and $b$ intersect the element 40. As shown, valves 37 and 39 will be operated during movement of the lever 40 to the right-hand and left-hand extremities respectively of slot 45, while valves 36 and 38 will be respectively operated by movement of the control lever 40 to the right-hand and left-hand extremities of slots 43 and 44. Valve 36 will be also operated upon movement of the control lever 40 to the right-hand extremity of slot 42. The operation of the valves due to the above referred to controlling movements of the lever 40 controls the admission and exhaust of fluid pressure to the selector and shifting devices 25 and 13 respectively in a manner which will appear more fully hereinafter.

As heretofore stated, the vehicle clutch-controlling member 9 is provided with a fluid pressure device 10 for controlling disengaging and engaging movements of such element. As shown, the element 9 is secured to a rotatable shaft 47 having an arm 48 attached thereto at one end which in turn is operatively connected with piston 49 in the device 10 through a piston rod 50. The piston 49 is housed within a cylinder 51 and is normally maintained in the position shown, with the clutch-controlling member 9 in clutch-engaged position, as by means of an expansible spring 52. It will be apparent, however, that upon application of fluid pressure to the cylinder through a suitable connection 53, the piston 49 will be moved in such a direction as to compress spring 52 and effect clutch-disengaging movement of the element 9.

In order that disengagement of the vehicle clutch shall be assured prior to any establishment of a gear relation in the transmission 4, the admission of fluid pressure to the shifting device 13 is contingent upon clutch-disengaging operation of the clutch actuator 10. To this end, a clutch-controlling valve mechanism 54 is provided which is operated during depression of the clutch-controlling pedal 55 and serves to admit fluid pressure from a reservoir 56 to the clutch actuator 10 through conduits 57 and 58. At the same time fluid pressure is admitted to the clutch actuator 10 through conduit 58, fluid pressure is also admitted through conduit 58 to the control unit 8 and the construction of the latter is such that fluid pressure through said conduit is led to valves 36 and 38 only, such valves controlling the flow of fluid pressure directly to the shifting device 13 through connections 32 and 31 respectively. In this manner, it will be readily observed that no energy is available to effect movement of the shifting device 13 until energy has been supplied to the clutch actuator 10 and hence clutch-disengaging movement of the element 9 takes place before the establishment of any gear relation. The supply of fluid pressure to the valves 37 and 39, however, is independent of the clutch-controlling valve 54 and operation of these valves serves to directly connect the reservoir 56 to the selector device 25 through conduits 59 and 33 or 34 depending upon whether valve 39 or valve 37 is actuated. Hence, selecting movement of the device 25 may take place without depressing the clutch-controlling member 55 but actual shifting movement to establish a gear relation can only be effected after movement of the clutch-controlling pedal. Such a valve may be constructed in accordance with the principles set forth in the patent to Lester A. Fowler, No. 1,626,607.

The clutch-controlling valve 54 is preferably of the self-lapping type and may be constructed in any suitable manner in order to effect a progressive control of the pressure supplied to the clutch actuator 10 in accordance with the pressure applied to the clutch pedal 55. Since this valve mechanism forms no part of the present invention, the same has not been shown in detail.

Referring more particularly to Fig. 3, the valve mechanism 37 is shown in detail therein and includes a bore 60 in which a pressure-responsive device, such as piston 61, is slidably mounted. The piston 61 divides the valve bore into an exhaust chamber 62 and an outlet chamber 63, the former normally communicating with atmosphere through a connection 64, while the latter is in constant communication with the conduit 34. As shown, the valve 37 is in normal released position wherein chamber 63 communicates with chamber 62 and the atmosphere through communicating ducts 65 and 66 in the piston 61, thereby exhausting conduit 34. However, when valve-operating movement of the cam 46 takes place, the piston 61 is moved downwardly through a cap 67 connected to the piston through a graduating spring 68 and the piston contacts an exhaust valve 69 in order to close communication between chambers 63 and 62. Further downward movement of the piston effects unseating of an intake valve 70, connected to the exhaust valve 69, and establishes communication between chamber 63 and the fluid pressure supply line 59 through an intake duct 71 formed in the casing of the control unit. It will be noted that after the above operation has been effected, the piston 61 will be subjected to the pressure of the fluid within the outlet chamber 63 which is proportional to the pressure of the fluid supplied to the conduit 34, and when such pressure rises to a value sufficient to overcome the tension of the graduating spring 68, the piston 61 will be moved upwardly to permit closing of the intake valve 70 under the action of a spring 72. The valve will thus be lapped and will remain in such position until the tension in spring 68 is increased or until such tension is relieved. In the latter event, the parts will be returned to the position shown in Fig. 3, such action being aided by a sping 73 acting upon the underside of piston 61.

The present invention provides a novel arrangement for cushioning the movement of the shifting piston at a point in the stroke of the latter when a gear relation is about to be established. Such construction is highly desirable, since it more closely simulates manual shifting of the transmission gears and avoids gear clashing and possible breakage of gear teeth during power shifting. As shown, such means includes a pair of cylinders 75 and 76 secured to the cover 11 and housing piston 77 and 78 respectively. Each of these pistons is provided with an adjustably-positioned tapered projection or pin 79 which is adapted to enter a socket 80 provided in the end wall of each cylinder. As shown, each of these sockets communicates with the conduit 58 through suitable connections 81, and by such an arrangement, it will be observed that each of the cylinders 75 and 76 is supplied with fluid pressure through conduit 58 whenever the clutch-controlling pedal is depressed. Since the pistons 77 and 78 have operative engagement with piston heads 14 and 15 through elongated skirts 82, it will be perceived that upon depression of the clutch-controlling pedal 55 and admission of fluid pressure to cylinders 75 and 76, the shifting device 13 will be returned to neutral position and thus neutralization of the transmission is assured irrespective of the gear relation established. Moreover, the pins 79 carried by the pistons 77 and 78 are so adjusted that during gear-establishing movement of the shifting device 13 in either direction, one of the pins 79 carried by the piston 77 or 78, depending upon the direction of movement of the device 13, will enter its associated socket 80 in order to restrict the exhaust of fluid from the respective cylinder 75 or 76 to the conduit 58, thus cushioning or retarding the remainder of the movement of the shifting device. The projections 79 are so adjusted with respect to the associated pistons that such exhaust of air is restricted at substantially the moment that the transmission gear relation is about to be established, thus cushioning the actual engagement of the gears and avoiding gear clashing and possible breakage of teeth. If desired, a supplemental inlet connection 84 may be utilized at the ends of the cylinders 75 and 76 connecting said cylinders with the conduit 58 and having check valves 83 therein permitting the flow of fluid in one direction only, namely to the cylinders, this construction being desirable in order to permit free entrance of fluid to the cylinders when it is desired to return the shifting device to neutral position through actuation of the clutch-controlling pedal 55.

In operation, if it is desired to select and establish first gear relation for example, the vehicle clutch-controlling pedal 55 may be depressed in the usual manner in order to connect reservoir 56 with the clutch actuator 10 through operation of valve 54, as heretofore described. It will be understood from this operation that fluid pressure will not only be conducted to the clutch actuator 10 through conduits 57 and 58 but fluid pressure will also be conducted through conduit 58 to the control unit 8, thereby rendering available a supply of fluid for valves 36 and 38. Subsequently, it is only necessary to move the control lever 40 to the right-hand extremity of slot 45 and forwardly or, as viewed in Fig. 1, to the left-hand extremity of slot 44, such movement successively operating valves 37 and 38 through the cams 46. Operation of valve 37 will conduct fluid pressure directly from the reservoir to the right-hand portion of the selector device 25, as viewed in Fig. 2, through conduit 59, valve 37 and conduit 34, thereby moving the piston 27 of the said selector device to oscillate the selector finger 17 to such a position that the depending portion 18 thereof engages the notched end 20 of shifter fork 7. Upon operation of valve 38, fluid pressure rendered available in the manner described above will be conveyed through conduit 31 to the piston head 14 and will cause movement of the piston assembly 13 to the left, as viewed in Fig. 1, in order to effect corresponding movement of the selected shifter bar 24. Thus, first gear relation will be established by successive operation of the vehicle clutch-controlling element 9 through the pedal 55 and movement of lever 40 which takes place in a manner simulating the movements of a conventional manually-operated selective gear-shifting lever.

It will be observed that at the time fluid pressure is applied to the piston 14 to effect first gear relation, as above described, fluid pressure is also applied to the neutralizing pistons 77 and 78 through conduit 58 which connects neutralizing cylinders 75 and 76 directly with the open clutch-controlling valve 54. However, although the pressures applied to said neutralizing pistons are opposed, the piston assembly 13 will be moved in response to the fluid pressure applied to piston head 14 by reason of the fact that the cross-sectional area of said last named piston is greater than the cross-sectional area of either of pistons 77 or 78.

During shifting movement of the piston assembly 13 in the manner above described, the fluid pressure contained within cylinder 75 will be forced outwardly through the opening 80 in the end of said cylinder, and when first gear relation is about to be established, the tapered pin 79 will enter the opening 80 in order to restrict the further egress of fluid pressure from the cylinder 75. At this point in the movement of the shifting assembly 13, the rate of movement thereof will be decreased or retarded throughout the remainder of its stroke and thus the actual engagement of the transmission gears to effect first gear ratio will be greatly facilitated. Such a construction prevents noisy gear engagement and clashing of gear teeth which might otherwise result in the event that the movement of the shifting assembly were not checked at the time first gear relation was about to be established.

Following selection and establishment of the first gear ratio, it is only necessary to permit return of the clutch-controlling pedal 55 to control the exhaust of fluid pressure from the actuator 10 whereupon the vehicle clutch-controlling member 9 will permit return of the vehicle clutch to engaged position through the action of the usual clutch control springs and the graduating spring 52 within the actuator 10.

Establishment of second gear relation is effected by depressing the clutch-controlling pedal 55 and moving the control lever 40 to the right-hand extremity of slot 44. In the first phase of this operation, that is upon depression of the clutch-controlling pedal 55, fluid pressure will be simultaneously applied to the neutralizing cylinders 75 and 76 and the pistons 77 and 78 therein will return the piston assembly 13 to central neutral position as soon as the control lever 40 has been moved a sufficient distance in the slot 44 to permit valve 38 to exhaust the fluid pressure applied to the piston head 14. As soon as the shifting assembly 13 is neutralized, the operation of the valve 36 caused by continued movement of the control lever 40 in the slot 44 will admit fluid pressure from the reservoir 56 through the clutch-controlling valve 54 and conduit 58 to the conduit 32, and thence to the piston head 15 and effect movement of the piston assembly 13, shifting finger 17 and shifter bar 24 to the right, as viewed in Fig. 1, in order to establish second gear relation. Here again, the actual engagement of the gears will be cushioned when the pin 79 carried by the piston 78 enters the opening 80 positioned in the end of neutralizing cylinder 76.

Establishment of third and fourth gear relations is effected by left and right-hand movement of lever 40 in slot 43 which controls valves 38 and 36 respectively, such operation serving to move the central shifter bar 23 to the left and right respectively. Reverse gear relation is selected by operation of the valve 39 through movement of the lever 40 to the left-hand extremity of slot 45 and continued movement of the said lever to the right-hand extremity of the slot 42 which effects operation of the valve 36. These movements serve to conduct fluid pressure to the left-hand end of selector device 25 to engage portion 18 of finger 17 with the shifter fork 5 and thereafter move the shifter bar 22 to which the fork is attached to the right, as viewed in Fig. 1.

During all of the above described shifting movements, the cushioning or checking devices 79 will cooperate with the openings 80 to cushion axial engagement of the gears and a neutralization of the transmission gears is effected upon depressing of clutch-controlling pedal 55 provided the valves 36 or 38 controlling the flow of fluid pressure to the piston heads 15 and 14 respectively are moved to exhaust position.

While the operation of the invention has been described in the above manner as being initiated with depression of the clutch-controlling pedal 55, it will be understood that since the invention provides an interlock between the control unit 8 and the clutch actuator 10, the control lever 40 may be moved to any desired position prior to actuation of the clutch-controlling pedal 55. For example, to establish first gear relation in this manner, it is only necessary to move the control lever 40 to the left-hand extremity of slot 44. Initial movement of the lever to the end of slot 45 will supply fluid pressure to the selector device 25 in order to select shifter bar 24. Operation of the valve 38, however, due to movement of lever 40 to the left-hand extremity of slot 44, will merely open a connection between valve 54 and the cylinder 12 containing piston head 14 through conduits 58 and 31. Actual supply of fluid pressure to the piston head 14, in order to effect gear-establishing movement of the latter, will not take place, however, until depression of the controlling pedal 55 which connects conduit 58 with the reservoir 56 through valve 54 and conduit 57. Thus, gear-selecting and establishing movement of the control lever may take place prior to any movement of the clutch-controlling member 55, and the gear relation, though selected, will not be established until valve 54 has been operated to supply the fluid pressure to the actuator 10 to disengage the vehicle clutch and furnish fluid power to effect the actual shifting operation.

There has thus been provided by the present invention a novel control mechanism for an automotive vehicle transmission which is so constituted as to be remotely controlled in a novel and efficient manner. The provision of the interlock between the control unit of the transmission and the vehicle clutch enables selecting and shifting movement of the operator's control member prior to declutching movement of the vehicle clutch, the arrangement being such that as soon as the vehicle clutch is disengaged, the selected gear ratio is established. The invention moreover provides a novel arrangement for cushioning engagement of the transmission gears, this being achieved by the utilization of the cushioning units associated with the power-operated shifting device. Such units moreover perform the additional function of effecting neutralization of the transmission upon depression of the clutch-controlling member 55 in the event that the operator's control member is moved to neutral position.

While only one embodiment of the invention has been disclosed and described herein, it is to be understood that the invention is not limited to such embodiment but may be capable of expression in other forms, as will now be understood by those skilled in the art. Reference will therefore be had to the appended claims for a definition of the limits of the invention.

What is claimed is:

1. In a control mechanism for a vehicle gear-shifting apparatus having a member laterally and longitudinally movable to select and establish a desired gear relation, a pressure-operated device for moving said member laterally, a pressure-operated device for moving said member longitudinally in opposite directions, a reservoir of fluid pressure, a vehicle clutch-controlling element, a power actuator therefor, a valve operable to connect said reservoir and actuator to effect clutch-disengaging movement of the clutch-controlling element, valve means operable to directly connect said reservoir and first device to select a desired gear ratio, valve means operable to connect said second device to said reservoir through said first named valve, whereby said second device is supplied with fluid pressure only when said valve is operated to connect the reservoir and actuator, and a manually-operable control lever mounted for movement in a selective gear-shifting simulating manner for operating said valve means.

2. In a control mechanism for a vehicle gear-shifting apparatus having a member laterally and longitudinally movable to select and establish a desired gear relation, a fluid pressure-operated device for moving said member laterally, a fluid pressure-operated device for moving said member longitudinally in opposite directions, a reservoir of fluid pressure, valve means operable to directly connect said reservoir and first device to select a desired gear ratio, a vehicle clutch-controlling element, a power actuator therefor, and means including a pedal-operated valve for connecting said reservoir and actuator to effect clutch-disengaging movement of the clutch-controlling element and for connecting said reservoir and said second device whereby the latter is moved to establish the desired gear ratio.

3. In a control mechanism for a vehicle gear-shifting apparatus having a member laterally and longitudinally movable to select and establish a desired gear relation, a double-acting fluid pressure-operated device for moving said member laterally in opposite directions to select a desired gear relation, a double-acting fluid pressure-operated device for moving said member longitudinally in opposite directions to establish the selected gear relation, a vehicle clutch-controlling element, a fluid pressure-operated motor therefor, a reservoir of fluid pressure, a pedal-operated valve for directly connecting said reservoir and motor to effect clutch-disengaging movement of said element, a pair of valves selectively operable to directly connect said reservoir to said first device whereby the latter is operated to move the member to select a desired gear relation, a second pair of valves selectively operable to establish communication between said second device and said motor whereby fluid pressure conducted to said motor will be led to said second device to effect movement of said member to establish the selected gear relation, and a manually-operable member movable in a selective gear-shifting simulating manner for controlling said pairs of valves.

4. In a control mechanism for a vehicle gear-shifting apparatus, a fluid pressure-operated shifting unit movable in opposite directions from a central neutral position to establish a selected gear relation, said unit including an oscillatable selector member movable to select a desired gear relation, fluid pressure means for effecting oscillating selecting movement of said member, means for controlling the flow of fluid pressure to said means and said unit including a control unit having a manually-operable lever, a clutch-controlling member, fluid pressure-operated means for effecting clutch-disengaging movement of said clutch-controlling member, manually-operable valve means for energizing said last named fluid pressure-operated means, and means dependent upon operation of said valve means for conducting fluid pressure to said control unit.

5. In a control mechanism for a vehicle gear-shifting apparatus having a selector and shifting member normally occupying a neutral position, means for mounting said member adjacent said apparatus, a fluid pressure-operated device for oscillating said member to select a desired gear ratio, a fluid pressure-operated device for shifting said member longitudinally for establishing the selected gear ratio, a vehicle clutch-controlling element, fluid pressure means for operating said element, a separate fluid pressure-operated device cooperating with said second named pressure-operated device for returning the latter together with the selector member to neutral position, and manually-operable means for supplying fluid pressure to said fluid pressure means and to said separate fluid pressure-operated device.

6. The combination with a shifter bar of an automotive vehicle transmission gearing, of a fluid pressure-operated device operatively connected with said bar and having a normal neutral position, means for admitting fluid pressure to said device to selectively move the latter and bar in either of opposite directions from said neutral position to establish a desired gear relation, and means operable only after a portion of the said movement has been completed for checking the remaining portions of the movement, said last named means constituting means operable by fluid pressure for positively returning said device and bar to neutral position.

7. The combination with a shifter bar of an automotive vehicle transmission gearing, of a fluid pressure-operated device operatively connected with said bar and having a normal neutral position, means for admitting fluid pressure to said device to selectively move the latter and bar in either of opposite directions from said neutral position to establish a desired gear relation, means operable to retard further movement of said device and bar only after sufficient movement of the latter has taken place that the gear relation is about to be established, and means for supplying fluid pressure to said last named means to return the device and bar to neutral position when desired.

8. The combination with a shifter bar of an automotive vehicle transmission gearing, of a fluid pressure-operated device operatively connected with said bar and having a normal neutral position, means for admitting fluid pressure to said device to selectively move the latter and bar in either of opposite directions from said neutral position to establish a desired gear relation, and common means for cushioning a part of the movements of said device during gear establishment and for returning said device and bar to neutral position.

9. The combination with a shifter bar of an automotive vehicle transmission gearing, of a fluid pressure-operated device including a double-acting piston operatively connected with said bar and having a normal neutral position, means for admitting fluid pressure to said device to selectively move the piston and bar in either of opposite directions from said neutral position to establish a desired gear relation, and means for cushioning a part of the movements of said piston and bar during gear establishment comprising independent pistons disposed on opposite sides of said double-acting piston.

10. The combination with a shifter bar of an automotive vehicle transmission gearing, of a fluid pressure-operated device including a double-acting piston operatively connected with said bar and having a normal neutral position, means for admitting fluid pressure to said device to selectively move the piston and bar in either of opposite directions from said neutral position to establish a desired gear relation, means for cushioning a part of the movements of said piston and bar during gear establishment comprising independent pistons disposed on opposite sides of said double-acting piston, and means for simultaneously subjecting said independent pistons to fluid pressure after the desired gear relation has been established to return the double-acting piston and bar to neutral position.

11. The combination with a plurality of shifter bars of an automotive vehicle transmission gearing, of a control mechanism therefor comprising a pressure-operated device for selecting a desired shifter bar, a double-acting piston movable in opposite directions from a neutral position for moving said selected bar to establish the desired gear relation, and means including independent pistons disposed in axial alignment with said double-acting piston for cushioning a portion of the gear-establishing movement of the latter.

12. The combination with a plurality of shifter bars of an automotive vehicle transmission gearing, of a control mechanism therefor comprising a pressure-operated device for selecting a desired shifter bar, a double-acting piston movable in opposite directions from a neutral position for moving said selected bar to establish the desired gear relation, means including independent pistons disposed in axial alignment with said double-acting piston for cushioning a portion of the gear-establishing movement of the latter, and means for simultaneously subjecting said independent pistons to fluid pressure to effect a return of said double-acting piston and selected bar to neutral position.

13. In a control mechanism for a vehicle gear-shifting apparatus having a selector and shifting member normally occupying a neutral position, means for mounting said member adjacent said apparatus, a fluid-operated device for oscillating said member to select a desired gear ratio, a fluid-operated device for shifting said member for establishing the selected gear ratio, means to control the admission and exhaust of fluid to and from said second device, and means including fluid-operated means for moving said second device and member to neutral position when fluid is exhausted therefrom.

14. In a control mechanism for a vehicle gear-shifting apparatus having a selector and shifting member normally occupying a neutral position, means for mounting said member adjacent said apparatus, a fluid-operated device for oscillating said member to select a desired gear ratio, a fluid-operated device for shifting said member for establishing the selected gear ratio, means to control the admission and exhaust of fluid to and from said second device, and means including a pair of independent fluid-operated pistons cooperating with said second device for moving the latter and member to neutral position when fluid is exhausted from said second device.

15. In a control mechanism for a vehicle gear-shifting apparatus having a selector and shifting member normally occupying a neutral position, means for mounting said member adjacent said apparatus, a fluid-operated device for oscillating said member to select a desired gear ratio, a double-acting piston for shifting said member for establishing the selected gear ratio, pistons disposed on opposite sides of said first piston, operatively connected with the latter and of less cross-sectional area, means for conducting fluid pressure simultaneously to the outer faces of the second named pistons, and means for conducting fluid pressure to the space between either of said second named pistons and said first named piston to effect movement of said first piston irrespective of fluid pressure supplied through said first named conducting means.

16. The combination with a shifter bar of an automotive vehicle transmission gearing, of a power-operated device for effecting shifting movement of said bar in opposite directions from a neutral position to establish either of a pair of selected gear ratios, and fluid pressure means separate from said device for returning the latter and bar to neutral position.

17. The combination with a shifter bar of an automotive vehicle transmission gearing, of fluid pressure means including a double-acting piston for effecting shifting movement of said bar in opposite directions from a neutral position to establish either of a pair of selected gear ratios, and fluid pressure means including a pair of independent pistons cooperating with said double-acting piston for returning the latter and bar to neutral position.

18. In a control mechanism for a vehicle gear-shifting apparatus having a selector and shifting member normally occupying a neutral position, means for mounting said member adjacent said apparatus, power means for oscillating said member to select a desired gear ratio, power means for shifting said member for establishing the selected gear ratio, means to control the energization of said second power means, and means including fluid-operated means for moving said second power means and member to a neutral position when the second power means is deenergized.

WILFRED A. EATON.